Figure 4:
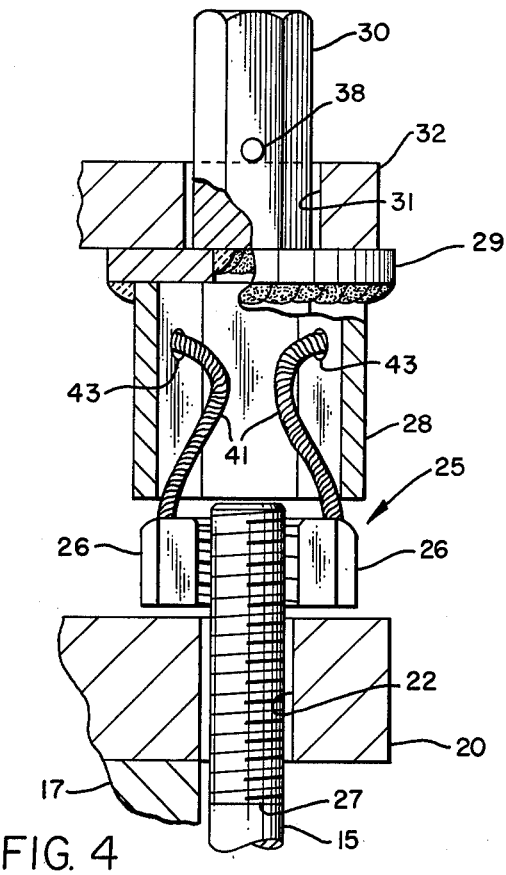

United States Patent [19]

von Base

[11] 4,082,468
[45] Apr. 4, 1978

[54] QUICK RELEASE SLEEVE RETAINED SPLIT NUT-BOLT STRUCTURE

[75] Inventor: Robert J. von Base, Arlington, Tex.

[73] Assignee: Oil States Rubber Company, Arlington, Tex.

[21] Appl. No.: 757,593

[22] Filed: Jan. 7, 1977

[51] Int. Cl.² ............................................. F16B 37/10
[52] U.S. Cl. ......................................... 403/2; 85/33
[58] Field of Search ...................... 85/33, 51, DIG. 1; 166/93, 94; 285/33, 34, 35; 403/2

[56] References Cited

U.S. PATENT DOCUMENTS

| 427,930 | 5/1890 | Suchland | 85/33 |
|---|---|---|---|
| 2,367,480 | 1/1945 | Beswick | 85/33 |
| 2,576,579 | 11/1951 | Donovan | 85/33 |
| 2,664,023 | 12/1953 | Mugford | 85/33 |
| 3,299,767 | 1/1967 | Royer | 85/DIG. 1 |
| 3,520,223 | 7/1970 | Lilly | 85/33 |
| 3,926,090 | 12/1975 | Bunker | 85/33 |

*Primary Examiner*—Marion Parsons, Jr.
*Attorney, Agent, or Firm*—Warren H. Kintzinger

[57] ABSTRACT

A split nut structure provides the holding power of an ordinary nut on a bolt while allowing for quick release through removal of a retaining sleeve from containment alignment around the segments of the split nut. What could be in many respects like an ordinary hex nut is in three segments, with cuts in three faces of the hex nut to the center, put around a bolt in the same manner as though they were connected and retained in this state by a hexagonal sleeve, the hex inside of which snuggly fits the nut itself. The outside hexagon of the sleeve provides for a wrenching surface by which the nut may be adjusted and tightened much the same as any ordinary hex nut — however, for quick release the sleeve is merely pulled straight up along the axis of the nut and the bolt.

10 Claims, 5 Drawing Figures

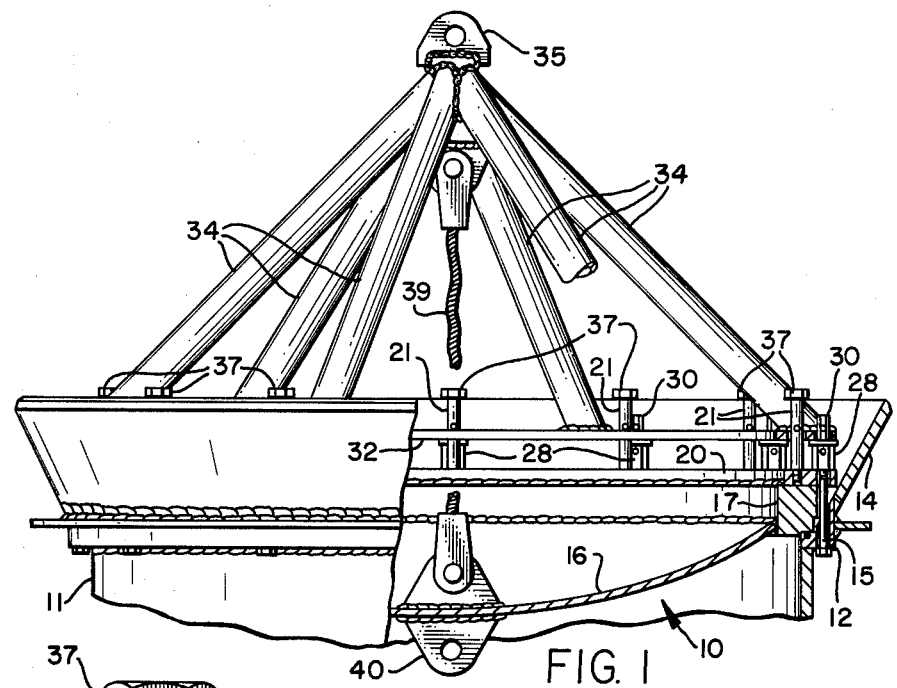
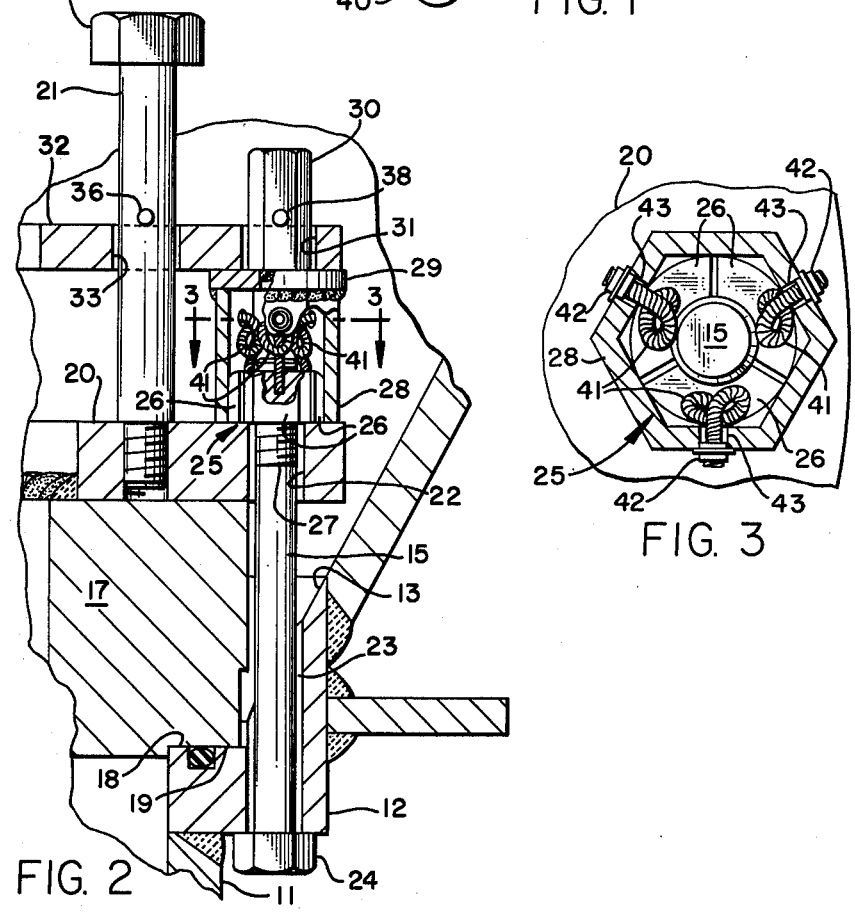

QUICK RELEASE SLEEVE RETAINED SPLIT NUT-BOLT STRUCTURE

This invention relates in general to nut and bolt structures, and in particular, to an improved quick release split nut structure allowing for quick release from a mating bolt through removal of a retaining sleeve.

Nuts and bolts have been used as assembly fastening and holding devices for centuries. A quick release nut and bolt structure having the holding power along with the tightening and adjustability of a conventional nut and bolt combination would be an advantageous convenience and expand the usefulness of nut and bolt structures particularly in various adverse environmental application locations. This is particularly the case, for example, in under water installations such as with off-shore platforms. One such use designed for involves use of applicant's quick release nut and bolt structure with twelve of them holding a top plug closure on a top skirt sleeve of an off-shore platform. In this useage the bolt and nut units are tightened individually since clearances cannot, as a practical matter, be manufactured close enough to allow use of a fixed length connector having an ordinary quick disconnect structure on the end. The new quick disconnect nut and bolt units are tightened separately to their own individual optimum to attach the top plug structure to an annular top skirt ring structure welded to the top of a platform sleeve. A hexagon sleeve of each quick disconnect bolt nut is interconnected by a retainer pin with an annular lifting plate, circling the entire bolt circle, that when lifted, lifts nut retaining sleeves and releases all the quick disconnect nuts of the structure nut and bolts at the same time in one simple motion that also separates the top plug structure from the skirt sleeve. Through use of this release structure need for a diver is eliminated along with the extra expense and time requirements of such diving operations without considering the hazzards involved. Thus, release and lifting of a top plug closure from the surface with a reliable quick release provides many savings. Tests with some nut and bolt assemblies using some threads show at times that one or more nut segments may not release when tightened down against a flat surface as the retaining sleeve is removed from the nut. This is overcome by use of a beveled washer and a matching segmented conical surface on the nut segments at the bottom with the slope away from the bolt to augment separation force under high load and/or friction lock conditions.

It is, therefore, a principal object of this invention to provide a reliable quick release nut and bolt structure.

Another object is to provide such a quick release nut and bolt structure having the reliable holding power of an ordinary nut on a bolt, with the same ease of tightening and adjustment.

A further object is to provide a sleeve plug release system using a plurality of quick release nut and bolt structures releasable either simultaneously or in a planned sequence.

Another object is to provide a quick release segmented nut and bolt structure without any falling of released nut segments upon quick release.

A further object is to provide a quick release segmented nut and bolt structure having positive nut segment release.

Features of this invention useful in accomplishing the above objects include, in a quick release retained split nut-bolt structure, a hex nut in three segments put around a bolt in the same manner as though they were connected and retained in this state by a hexagonal sleeve the hex inside of which snuggly fits the nut itself. It is a structure with quick release provided by merely pulling the hex sleeve straight up along the axis of the nut and bolt until the nut sements are cleared to fall away from the bolt. The nut segments in some units are connected by flexable cable segments to the sleeve to prevent falling of released nut segments into other mechanism. The quick release segmented nut and bolt is incorporated into a removable top plug structure fastened on the top of an off-shore platform skirt sleeve for quick release under water without requiring a diver.

A specific embodiment representing what is presently regarded as the best mode of carrying out the invention is illustrated in the accompanying drawings.

Figure 5:
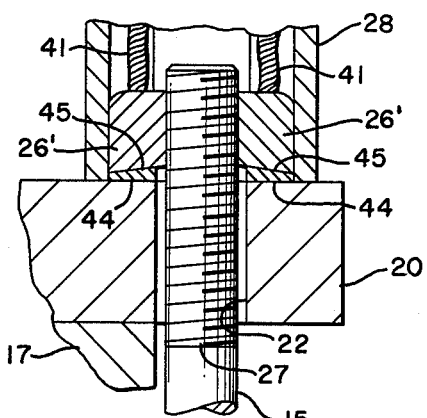

In the drawings:

FIG. 1 represents a side elevation partially cut away and sectioned view of a removable top plug fastened in place on the top of an off-shore platform skirt sleeve by a plurality of quick release nut-bolt structures;

FIG. 2, an enlarged partial side elevation partially broken away and sectioned view of the split nut and bolt assembly portion of FIG. 1;

FIG. 3, a top enlarged view taken from line 3—3 of FIG. 2 of a retainer sleeve enclosed split nut on a bolt;

FIG. 4, a side elevation partially broken away and sectioned view of the split nut and bolt assembly of FIGS. 2 and 3 with the retainer sleeve drawn up above the split nut segments for quick release; and, FIG. 5, a side elevation partially broken away and sectioned view of another quick disconnect segmented nut and bolt embodiment using a beveled washer for enhanced nut segment-bolt disconnect.

Referring to the drawings:

The top plug assembly 10 is shown in FIG. 1 to be fastened in place as a closure structure at the top of an off-shore platform skirt sleeve 11 that is a submerged portion of an off-shore platform when the platform is in place resting on the ocean floor. An annular bolt holding mount member 12, welded to the top of skirt sleeve 11, has a conical segment surface 13 that together with guide member 14 forms a truncated conical guide for locating the top plug assembly 10 as it is being positioned for bolt 15 fastening on mount member 12 at the top of sleeve 11. The top plug assembly 10 has a metal disc 16 welded at the outer periphery to annular member 17 having a seating surface 18 that rests on shoulder 19 of mount member 12. An annular plate 20, welded on the top of annular member 17, mounts a plurality of lifting bolts 21 threaded thereinto and provides an annular flange with through openings 22 through which bolts 15 extend. Bolts 15 also extend through openings 23 in mount member 12 to clamp top plug assembly 10 on the top of skirt sleeve 11 with bolt heads 24 below mount member 12 and split nuts 25 tightened down on bolts 15 to exert clamping force against the upper surface of annular plate 20.

Referring also to FIGS. 2, 3 and 4, split nut 25 is like a hex nut but in three segments 26, with cuts in three faces of the hex nut to the center, positioned around the threaded end 27 of a bolt 15 as though they were connected and normally retained in this state by hexagon sleeve 28. Hexagon sleeve 28 provides a hexagon wrenching surface the hex inside of which is a snug sliding fit on the split nut 25 itself. Hexagon sleeve 28 is provided with an end cap 29 that mounts an upper hexagon extension 30 by which the split nut 25 may be adjusted by wrenching tool action. The quick release split nut 25 and bolt 15 structure as used in a release structure for the top plug assembly 10 is positioned with the upper hexagon extension 30 extended through respective openings 31 in lifting plate 32 an annular plate also provided with openings 33 through which lifting bolts 21 are a sliding fit. Lifting plate 32 is provided with a plurality of tubular lift members 34 interconnecting the plate 32 with a hoist connection 35. When shear pins 36 in lifting bolts 21 are sheared with lifting force applied from hoist connection 35 through members 34 to lifting plate 32 the plate 32 is lifted through a range of movement from the position shown in FIG. 1 to a position in engagement with the bottom side of bolt heads 37. This range of movement is sufficient to lift the hexagon sleeves 28, lifting through retainer pins 38 extended through upper hexagon extensions 30, vertically clear of the respective split nuts 25 to a quick release state such as shown in FIG. 4. This results in release of all quick release split nuts 25 from bolts 15 such that with continued lifting force of sufficient magnitude being exerted on hoist connection 35 as transmitted through lifting plate 32 to lifting bolts 21 the top plug assembly 10 is lifted from the top of skirt sleeve 11 even though the structure is in the submerged state. A secondary pickup structure is provided from hoist connection 35 through cable assembly 39 to the top plug assembly metal disc 16 and via connective member 40 to lower structure to be removed, such as a diaphragm support (not shown), from the skirt sleeve 11.

In the off-shore platform under water installation of FIG. 1 and some installations where it is important that loose parts and nut segments be retained from falling into other mechanism each of the nut segments 26 is tied to its sleeve 28 with individual lengths of flexible cable 41. Each length of flexible cable 41, that extends from an enlarged end fitting 42 outside of the hex sleeve 28 through a sleeve opening 43 to connection with a nut segment 26, is long enough to allow the sleeve 28 to clear the nut before they become taut. The top plug 10 installation of FIG. 1 in one design uses twelve of the quick disconnect split nut and bolt structures for holding the top plug closure on the top of a skirt sleeve in an off-shore platform. The design is such as to permit adjustment of split nut and bolt units individually since in such a structure clearances are difficult to hold so close as to allow use of fixed length connectors with an ordinary quick disconnect structure on the end. Each of the twelve split nut and bolt units is tightened separately to its own optimum tautness even though covering sleeves 28 are connected to a common lifting plate 32 circling the entire bolt circle. Raising lifting plate 32 separates the top plug from the skirt sleeve 11 in one simple motion such as to eliminate need for a diver (a fairly expensive operation). The reliable quick release saves money not only in eliminating need for a diver, but also by making release operations quicker through operational time savings as well.

In the alternate quick disconnect segmented nut and bolt embodiment of FIG. 5 the nut segments 26' are modified to accommodate a hardened beveled washer 44 therebeneath. This structure is provided since tests with some nut and bolt assemblies with shallow angled threads have shown that, at times, one or more nut segments may not release when tightened down against a flat surface when they should release as the retaining sleeve 28 is removed. The problem is overcome through use of a beveled washer 44 having an upper beveled surface sloping away from the bolt and with the nut segments 26' having matching segmented conical surfaces 45 at the bottom to cooperatively augment separation force under high load and/or friction lock conditions.

Whereas this invention is illustrated and described with respect to a plurality of embodiments thereof, it should be realized that various changes may be made without departing from the essential contributions to the art made by the teachings hereof.

I claim:

1. In a quick release structure: a nut and bolt combination with the bolt having bolt threads and the nut being an internally threaded nut threadingly engaging bolt threads and adjustable for tightening and loosening on said bolt threads; said nut being a segmented nut with a plurality of segments and in nut assembled form having a multi-faced exterior; a sleeve having a multi-faced interior matching the multi-faced exterior of said segmented nut and sized to be a longitudinally sliding fit on said segmented nut for quick release of said nut and bolt by drawing of said sleeve clear of said segmented nut; wherein said sleeve is provided with wrenching surface means by which said segmented nut may be adjusted and tightened; flexible material length means interconnect said nut segments and said sleeve to prevent falling of released nut segments into other mechanism; and, wherein said flexible material length means is in the form of flexible cable segments one for each of said nut segments; and with each of said flexible cable segments long enough to allow said sleeve to clear the segmented nut for quick release without the cable segments becoming taut.

2. The quick release structure of claim 1, wherein said segmented nut, in assembled form, is a hexagonal nut with said multi-faced exterior being six outer faces; and with said plurality of segments being three nut segments forming said segmented nut.

3. The quick release structure of claim 2, with the three nut segments formed with cuts in three faces of the hexagonal nut through the nut wall toward the center.

4. The quick release structure of claim 1, wherein said wrenching surface means is in the form of multi-faces on the exterior of said sleeve matching the multi-faced interior of said sleeve.

5. The quick release structure of claim 1, wherein said wrenching surface means is provided on extension means from an end of said sleeve in the direction of sleeve removal for quick release of said nut segments from the bolt threads.

6. The quick release structure of claim 1, wherein said nut and bolt combination includes a beveled washer means; with conical surfaces on the nut segments matching the beveled surface of said beveled washer means; and with the beveled washer means beveled surface and the matching conical surfaces on the nut segments sloping away from the bolt to augment separation force under high load and/or friction thread lock conditions.

7. In a quick release structure: a nut and bolt combination with the bolt having bolt threads and the nut being an internally threaded nut threadingly engaging bolt threads and adjustable for tightening and loosening on said bolt threads; said nut being a segmented nut with a plurality of segments and in nut assembled form having a multi-faced exterior; a sleeve having a multi-faced interior matching the multi-faced exterior of said segmented nut and sized to be a longitudinally sliding fit on said segmented nut for quick release of said nut and bolt by drawing of said sleeve clear of said segmented nut; wherein said sleeve is provided with wrenching surface means by which said segmented nut may be adjusted and tightened; with a plurality of said nut and bolt combinations used in clamping a first structural element and a second structural element together; a lifting plate connected to the sleeve of each segmented nut of said nut and bolt combinations; and lifting means for lifting said lifting plate and each of said sleeves for quick release of said nut and bolt combinations and said first structural element from said second structural element.

8. The quick release structure of claim 7, wherein lifting bolts are threaded into said first structural element and extend to bolt heads above said lifting plate and spaced from said lifting plate and in position to be engaged by said lifting plate after said lifting plate has raised each of said sleeves to clear the segmented nuts of said nut and bolt combinations for quick release.

9. The quick release structure of claim 8, wherein said lifting plate is in the form of an annular plate with structural interconnect means connected to hoist connect means; said first structural element is a removable top plug structure for said second structural element; and with said second structural element an offshore platform skirt sleeve structure.

10. In a quick release structure for release of a first structural element clamped to a second structural element: a plurality of nut and bolt combinations as clamping means for clamping said first and said second structural elements together; the nuts of said nut and bolt combinations being segmented nuts each with a plurality of segments and in nut assembled form having a multi-faced exterior; a sleeve for each segmented nut having a multi-faced interior matching the multi-faced exterior of each said segmented nut and sized to be a longitudinal sliding fit on the respective segmented nut for quick release of said segmented nuts from the bolts of said nut and bolt combinations by drawing of said sleeves clear of said segmented nuts; and withdrawal means connected to each of said sleeves for disconnect withdrawal of said sleeves and quick release of said segmented nuts and said first structural element from said second structural element; wherein said first structural element is a top plug structure; said second structural element is a skirt sleeve; with said top plug structure clamped to said skirt sleeve in an underwater environment of an off-shore platform; and with said withdrawal means for quick release of said segmented nuts and said top plug structure from said skirt sleeve having hoist connective means for quick disconnect actuation from above the surface of the water.

* * * * *